US011975562B1

(12) United States Patent
West

(10) Patent No.: US 11,975,562 B1
(45) Date of Patent: May 7, 2024

(54) BEAD BOARD HAVING TWO SIDES

(71) Applicant: Cam West, Santa Rosa, CA (US)

(72) Inventor: Cam West, Santa Rosa, CA (US)

( * ) Notice: Subject to any disclaimer, the term of this patent is extended or adjusted under 35 U.S.C. 154(b) by 0 days.

(21) Appl. No.: 18/500,013

(22) Filed: Nov. 1, 2023

(51) Int. Cl.
*A63H 33/06* (2006.01)
*B44C 3/12* (2006.01)

(52) U.S. Cl.
CPC ............. *B44C 3/123* (2013.01); *A63H 33/06* (2013.01)

(58) Field of Classification Search
CPC ........ A63H 33/00; A63H 33/04; A63H 33/06; A63H 33/08; A63H 33/14; B44B 9/00; B44B 3/12; B44C 3/123
USPC ...................................... 269/289; 446/75, 76
See application file for complete search history.

(56) References Cited

U.S. PATENT DOCUMENTS 10,478,740 B2 * 11/2019 Sakai ..................... A63H 33/00
D891,515 S * 7/2020 Sakai ........................... D19/111
2013/0236679 A1 * 9/2013 Bizzotto ................. B23P 11/00
29/428

* cited by examiner

*Primary Examiner* — Kien T Nguyen
(74) *Attorney, Agent, or Firm* — Sam Pierce

(57) ABSTRACT

According to an aspect of the present invention, a double-sided bead board, comprising: a base; a first pattern of recessed designs on a first side of the base; and a second pattern of recessed designs on a second side of the base.

7 Claims, 3 Drawing Sheets

BEAD BOARD HAVING TWO SIDES

BACKGROUND

Beads can be fused together to create works of art that can be used in jewelry, keychains, and other ornaments. Apparatuses for holding beads in a pattern on a board have been described in the prior art patent literature.

For example, U.S. Ser. No. 10/328,356 discloses an apparatus for holding beads in a pattern which has a beading board having a base with a bottom side and a top side. A plurality of posts project out from the top side of the base and are configured to extend through holes in beads to hold the beads in lateral position relative to each other. The apparatus has a perforated panel having perforations that are larger in width than the posts, and the perforated panel is configured to be removably placed on the beading board with the posts extending through the perforations. The perforated panel slides along the posts and sliding of the perforated causes beads placed on the posts to slide vertically along the length of the posts.

U.S. Pat. No. 5,704,789 discloses bead drawing kit comprising a plurality of beads and a drawing board which includes: a base member having a looped upright surrounding wall and a horizontal base plate disposed in said surrounding wall, said base plate having a periphery connected to said surrounding wall and being formed with a plurality of lower holes that are arranged in rows and columns for passage of said beads therethrough; a holding plate made of a resilient material and provided on said base plate, said holding plate being formed with a plurality of slits, each of which is aligned with a respective one of said lower holes in said base plate and forms at least two resilient fins on said holding plate for holding releasably one of said beads; a positioning plate secured to said base plate such that said holding plate is clamped between said base plate and said positioning plate, said positioning plate being formed with a plurality of upper holes that are aligned with said slits in said holding plate to permit entry of said beads into said slits; and a base cover having a bottom plate and a looped peripheral wall which extends from said bottom plate and which engages removably said surrounding wall of said base member; whereby, said beads can be set on said drawing board in selected ones of said slits in said holding plate to form a desired image on said drawing board, said beads being capable of being depressed to release said beads from said holding plate, said beads which are released from said holding plate passing through aligned ones of said lower holes in said base plate for collection in said base cover.

Nevertheless, existing bead boards are configured for holding beads on a single side.

SUMMARY OF INVENTION

An improved bead board which is double sided to allow for greater variety of designs would be desirable.

Therefore, according to an aspect of the present invention, there is provided to an aspect of the present invention, a double-sided bead board, comprising: a base; a first pattern of recessed designs on a first side of the base; and a second pattern of recessed designs on a second side of the base.

DETAILED DESCRIPTION

The present invention is a bead boards for stringing together beads with recessed sections for designs and storage of beads on both sides.

The board of the present invention can be made from materials such as metal, plastic, and various types of wood. It is made from bamboo in a preferred embodiment.

In some embodiments the board may have one or more handles or straps protruding from the perimeter (e.g., rope handles, wooden handles, bamboo handles, metal handles, and plastic handles, etc.). A lid may also be provided for the bead board.

In embodiments there can be measurements on the board, for example in inches or centimeters around the inside or outside of design elements, helping to achieve the correct measurements for designs.

Figure 1:
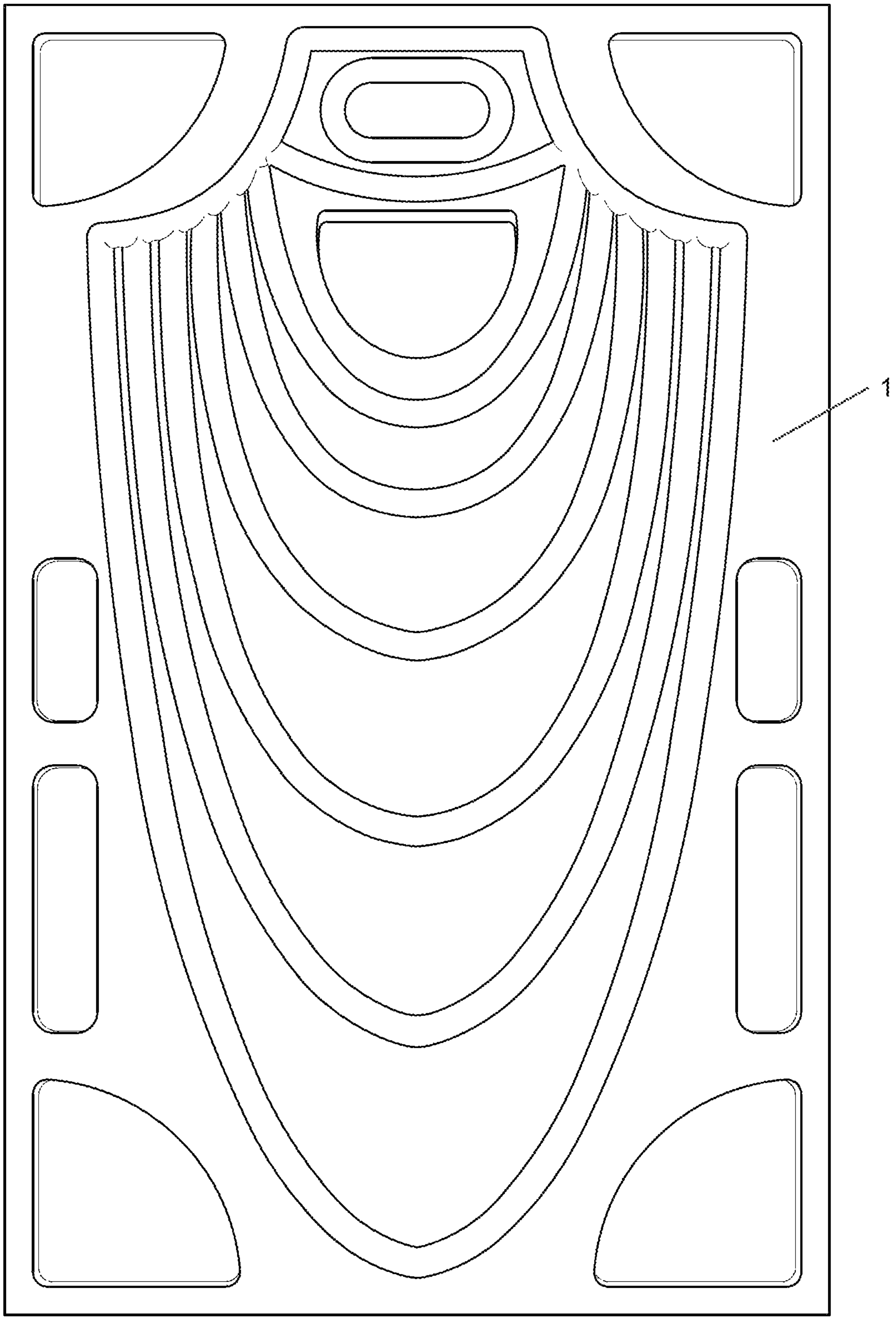
FIG. 1 is a top-down view of one side of a bead board according to an embodiment of the present invention.

FIG. 1 is a top-down view of one side of a bead board according to an embodiment of the present invention.

First side of the bead board 1 has a first design 4. It can be customized for a necklace for example. The user arranges beads into a pattern on first side of the bead board 1, one bead at a time or multiple beads at one time. The bead board can be specifically configured and shaped to resemble the object being made, or can be rectangular, circular, or some other generic shape.

Figure 2:
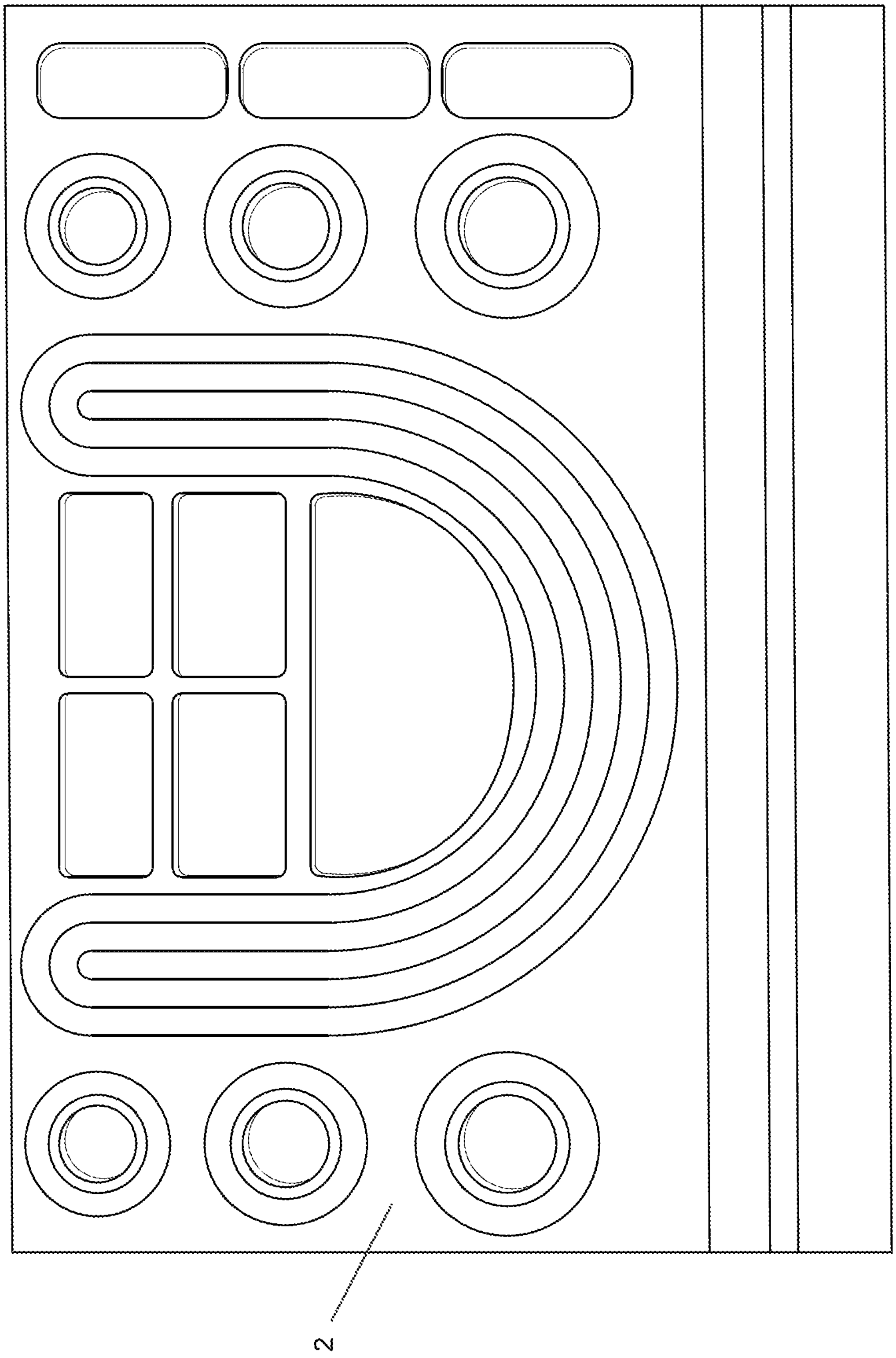
FIG. 2 is a top-down view of the other side of the board.

FIG. 2 is a top-down view of the other side of the board.

Second side of the bead board 2 has a second design 5. It can be customized for a bracelet for example. It is possible for the second design to be the same as the first design, but in a preferred embodiment it is different to allow for increased versatility of the design options available.

Figure 3:
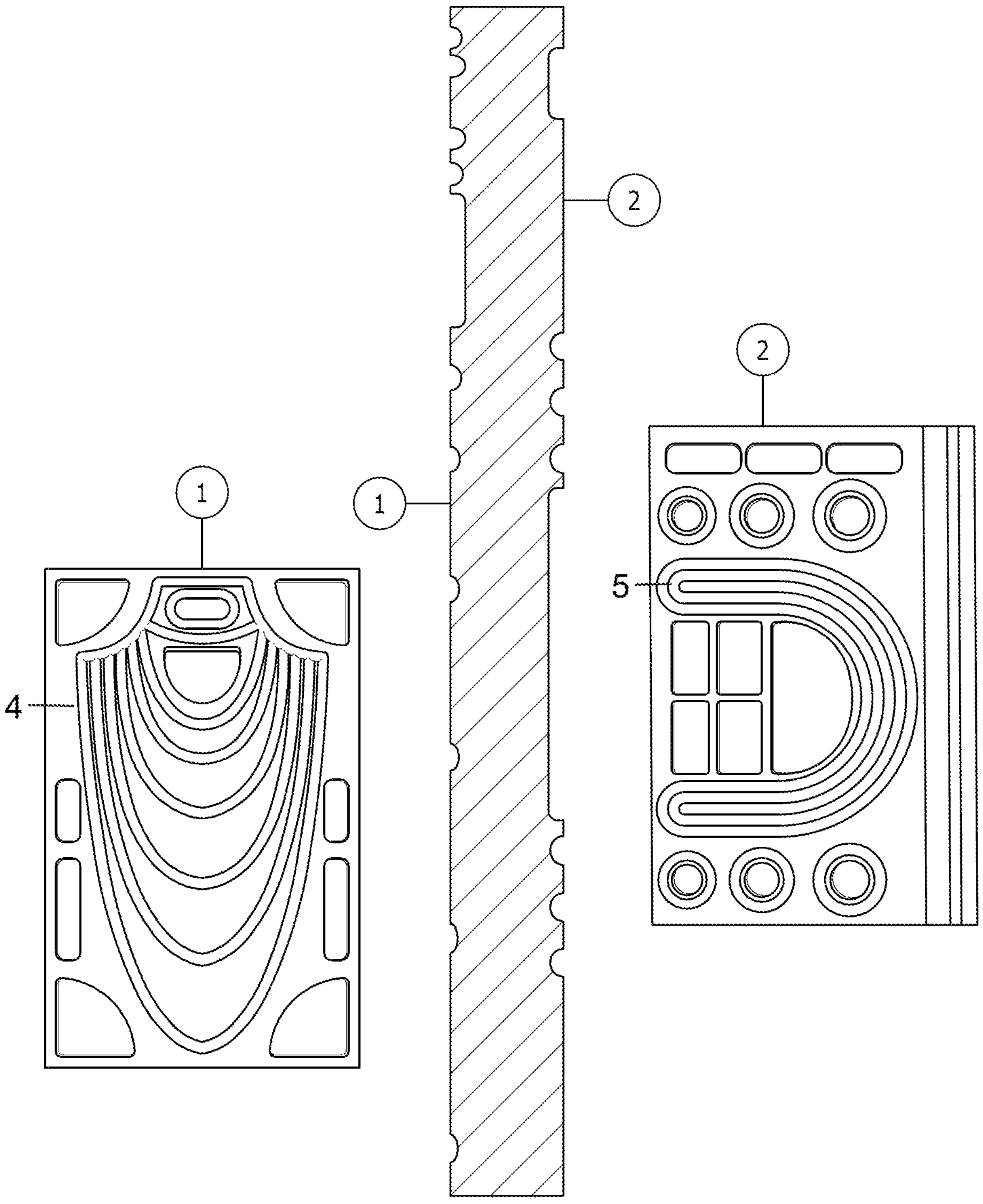
FIG. 3 is a side view of the board illustrating both sides in cross-section.

FIG. 3 is a side view of the board illustrating both sides in cross-section.

First side of the board 1 and second side of the board 2 are on either side of the boards shown from the side. In some embodiments, the board may consist of 3 layers, with a central solid layer sandwiched between two outer layers containing recessed designs. The recessed outer layers may span the full thickness of the outer layers of the partial thickness of the outer layers.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Similar numerals designate similar elements among the several figures. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed.

What is claimed is:

1. A double-sided bead board, comprising:

a base;

a first pattern of recessed designs on a first side of the base said first pattern of recessed designs are configured to accommodate two or more different length necklaces; and a second pattern of recessed designs on a second side of the base, wherein:

the first pattern of recessed designs and second pattern of recessed designs have measurements marked in inches or centimeters around the inside or outside of the recessed designs;

the first pattern of recessed designs and second pattern of recessed designs face in opposite directions; and the recesses of the first pattern and the recesses of the second pattern are separated by a solid material.

2. The double-sided bead board of claim 1, wherein the base is made from a material comprising bamboo.

3. The double-sided bead board of claim 1, wherein the base is rectangular.

4. The double-sided bead board of claim 1, wherein the second pattern of recessed designs on the second side said second pattern of recessed designs are configured to accommodate two or more different sizes of bracelets.

5. The double-sided bead board of claim 1, wherein the base is ½ inch to 1 inches thick.

6. The double-sided bead board of claim 1, wherein the recessed designs are ¼ inch to ½ inch deep.

7. The double-sided bead board of claim 1, wherein the base comprises a first outer layer;

a second outer layer; and a base layer between the two outer layers, and wherein a first pattern of recessed designs is etched into the first outer layer and a second pattern of recessed designs is etched into the second outer layer.

* * * * *